United States Patent [19]

Ushiro et al.

[11] Patent Number: 4,776,688
[45] Date of Patent: Oct. 11, 1988

[54] OVERHEAD PROJECTOR

[75] Inventors: Seimei Ushiro, Tokyo; Bunsuke Emura, Musashino, both of Japan

[73] Assignee: Fuji Photo Film, Kanagawa, Japan

[21] Appl. No.: 8,536

[22] Filed: Jan. 29, 1987

[30] Foreign Application Priority Data

Jan. 30, 1986 [JP] Japan .............................. 61-11829[U]
Jan. 30, 1986 [JP] Japan .............................. 61-11830[U]

[51] Int. Cl.$^4$ ............................................. G03B 21/00
[52] U.S. Cl. ..................................... 353/66; 353/119
[58] Field of Search .................................. 353/65–67, 353/119, DIG. 3, DIG. 4

[56] References Cited

U.S. PATENT DOCUMENTS

| 3,459,475 | 8/1969 | Lucas | 353/DIG. 4 X |
| 4,156,561 | 5/1979 | Lucas | 353/DIG. 4 |
| 4,588,271 | 5/1986 | Emura | 353/66 |

Primary Examiner—Harry N. Haroian
Attorney, Agent, or Firm—Lee C. Robinson, Jr.

[57] ABSTRACT

An overhead projector having a stationary main body including a Fresnel plate, a projection unit, and a swingable member for supporting the projection unit and swingably secured to the main body. The overhead projector comprises one way clutch means through which the swingable member is secured to the main body and which is adapted to limit the swinging motion of the swingable member towards the main body.

8 Claims, 6 Drawing Sheets

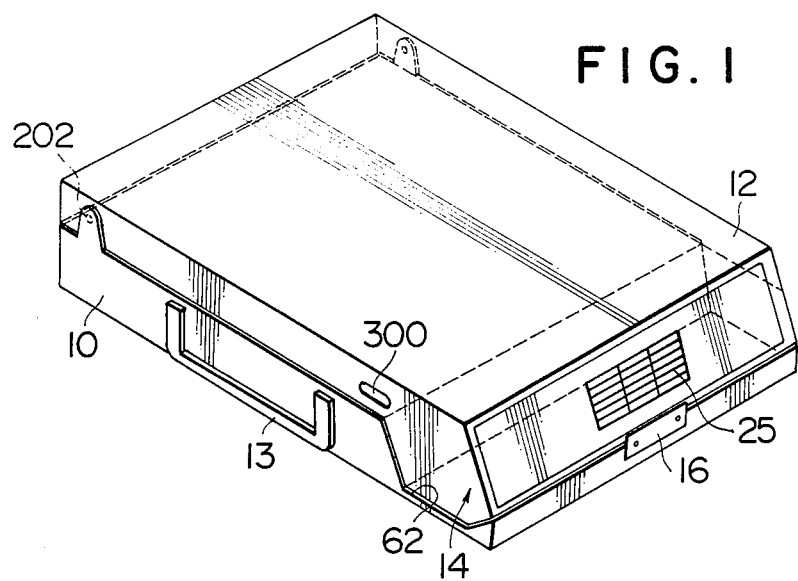
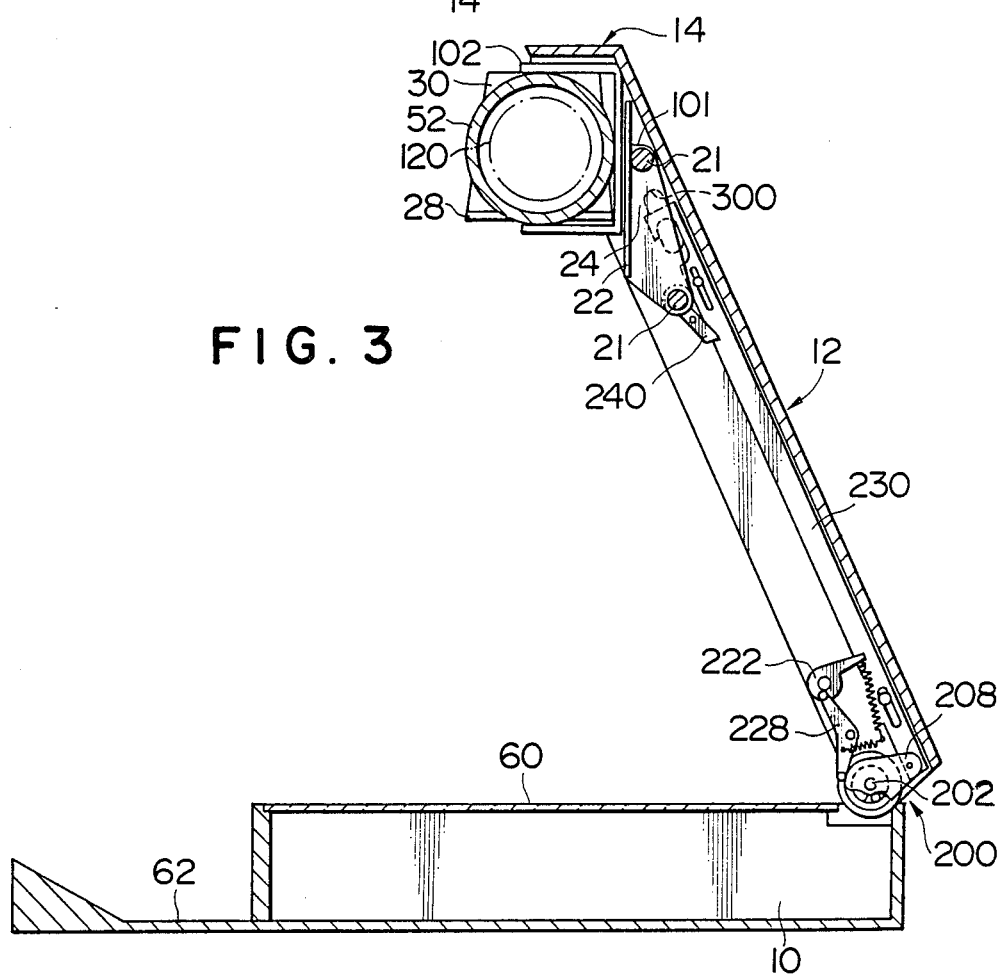

OVERHEAD PROJECTOR

BACKGROUND OF THE INVENTION

1. Field of the Invention

The present invention relates to an overhead projector and, more particularly, to an overhead projector of the type having a projection unit supported by a swingable member which is swingably attached to a main body of the overhead projector.

2. Description of the Prior Art

An overhead projector of the type mentioned above has been known. This known overhead projector has suffered from a problem in that the swingable member, which supports the projection unit at the free end thereof, may accidentally fall down onto the main body, which produces an impact or shock resulting in serious damage to a Fresnel lens incorporated in the main body and/or to the projection unit carried by the swingable member. This problem is serious particularly when the overhead projector is designed such that the projection unit can be selectively set either in a projecting position on the extreme end of the swingable member or in a storage position, because if the swingable member falls down with the projection unit set in the projecting position, the projection unit drops directly onto the main body, increasing the degree of seriousness of the damage.

In order to overcome this problem, it has been proposed to connect the swingable member to the main body through a suitable resilient means which resiliently urges the swingable member such as to prevent the falling of the swingable member. Such a resilient means, however, can not produce a force large enough to prevent the accidental fall of the swingable member, due to restrictions concerning the location and size of the resilient means.

SUMMARY OF THE INVENTION

Accordingly, it is an object of the present invention to provide an overhead projector in which a swingable member supporting a projection head and other associated parts can be moved freely upward by hand to a projecting position but is held still after release from the hand against any tendency for the swingable member to fall down unintentionally, thereby protecting the overhead projector against any damage.

It is another object of the present invention to provide an overhead projector having a projection unit adapted to be set selectively either in a projecting position or in a storage position, improved in such a way as to avoid any erroneous operation of a one-way clutch through which the swingable member is secured to the main body, when the projection unit is in the projecting position on the extreme end of the swingable member.

Another object of the present invention is provide a compact overhead projector.

To this end, according to the present invention, there is provided an overhead projector having a base including a Fresnel plate, a projection unit, and a swingable member for supporting the projection unit and swingably secured to the base, comprising one-way clutch means through which the swingable member is secured to the base, the one-way clutch means being adapted to limit the swinging motion of the swingable member towards the base.

In preferable aspects of the present invention, said one-way clutch means includes a ratchet, and said swingable member constitutes a cover member for covering said base or a supporting post.

According to another aspect of the present invention, there is provided an overhead projector having a base including a Fresnel plate, a projection unit, and a swingable member for supporting the projection unit ans swingably secured to the base, the projection unit being adapted to be selectively set either in a projecting position or in a storage position, comprising: one-way clutch means through which the swingable member is secured to the base such that the one-way clutch means limits the swinging motion of the swingable member towards the base; and locking means for dismissing the locking function of the one-way clutch in accordance with the movement of the projection unit towards the storage position.

In preferable aspect of the present invention, an overhead projector has a reflecting Fresnel plate, an illumination unit including a light source and an illumination mirror for reflecting light from the light source to the Fresnel plate and located over the Fresnel plate, and a projection unit including a projection mirror and a projection lens and located over the Fresnel plate, and an object is positioned between the Fresnel plate and the projection unit, characterized in that the light source is substantially located between the illumination mirror and the projection mirror.

In another preferable aspect of the present invention, an overhead projector has a reflecting Fresnel plate, an illumination unit including a light source and located over the Fresnel plate, and a projection unit including a projection mirror and a projection lens and located over the Fresnel plate, characterized in that a base is provided with the Fresnel plate at the top, a cover member is provided with the projection unit at one end portion thereof and pivoted on the base at the other end portion, and the projection unit is mounted so as to slide on the cover member parallel to a pivot axis of the cover member, and the projection lens is protruded from the cover member at the projecting operation.

The above and other objects and features of the present invention will become apparent from the following descriptions of preferred embodiments made with reference to the accompanying drawings.

BRIEF DESCRIPTION OF THE DRAWINGS

FIG. 1 is a perspective view of an overhead projector embodying the present invention with its cover member in a closed position;

FIG. 3 is a sectional view taken along the line II—II of FIG. 2;

DETAILED DESCRIPTION OF THE PREFERRED EMBODIMENTS

Referring to FIG. 1, a portable reflection-type overhead projector embodying the present invention has a box-shaped main body 10 and a cover member 12 pivotably or swingably secured to the main body 10.

Figure 2:
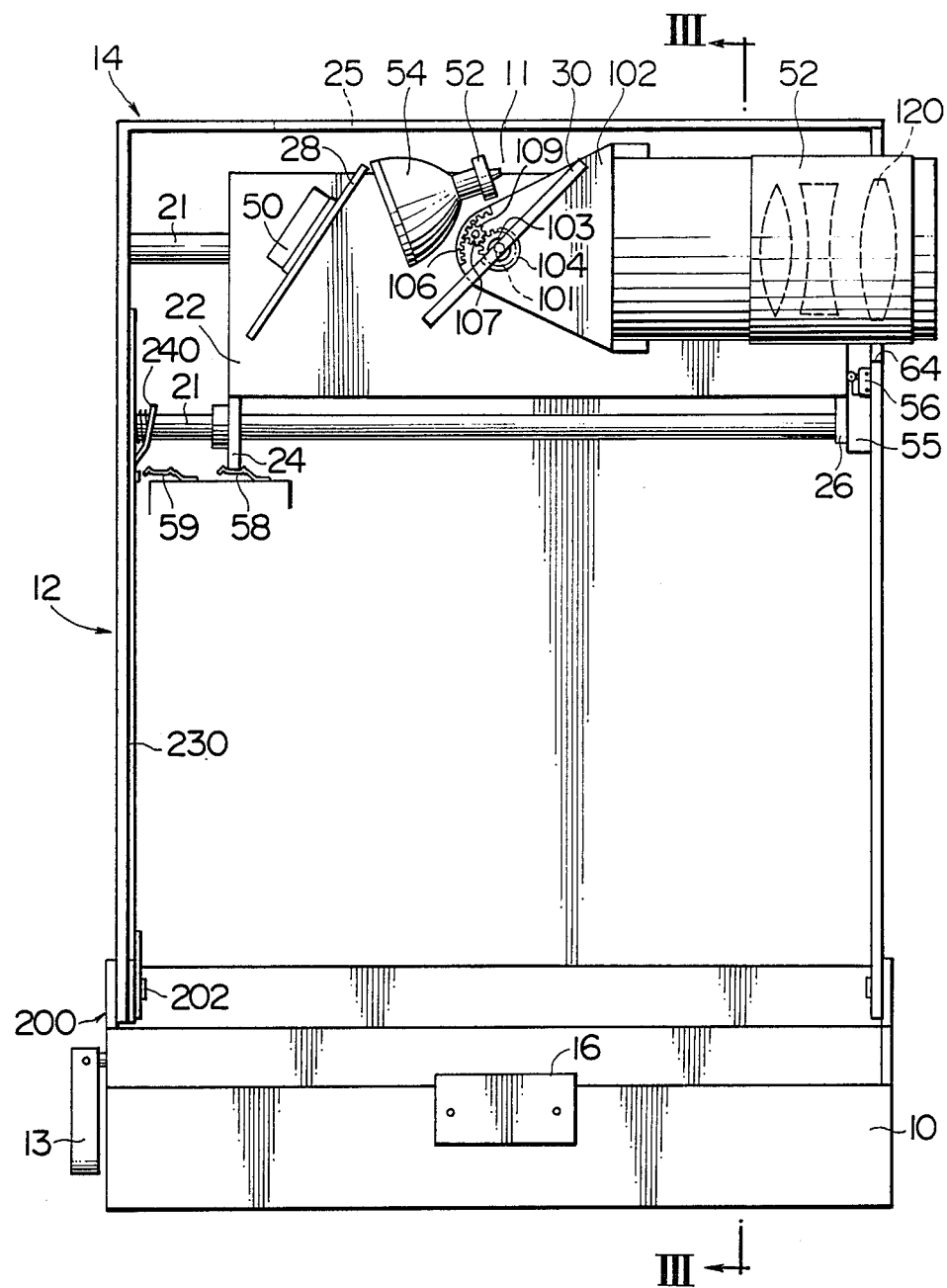
FIG. 2 is a front elevational view of the overhead projector with the cover member opened and a projection unit set in a projecting position.

As will be seen from FIGS. 2 and 3, the cover member 12 is provided on the free end thereof with a housing 14 in which are laid a pair of rails 21 along which a projection unit 11 slides, through the intermediary of slide plates 24, 26 slidably carried by these rails 21 and fixed to both ends of a projection unit frame 22.

The projection unit frame 22 has, as shown in FIG. 2, an illuminating mirror 28 which is secured thereto through an illuminating mirror mounting member 50. To the projection unit frame 22 is also secured a light source lamp 54 through a light source mounting member 52. The projection unit frame 22 is further provided with a shaft 101 which supports a lens barrel holding member 102 for holding a lens barrel 52 and a reflection mirror holding member 103 for holding a reflection mirror 30.

A sun gear 104 is formed on the reflection mirror holding member 103 integrally therewith. The lens barrel holding member 102 is provided with an internally-toothed gear 106. A planetary gear 109 is secured to the lens barrel holding member 102 by means of a pin 107. The arrangement is such that any change α° in the angle of the lens barrel 52 for setting the projection angle is transmitted through the above-mentioned gear train to the reflection mirror 30. The gear train reduces the angle α° into a half angle, i.e., ½α°. A compression leaf spring member (not shown) is provided on the portion of the shaft 101 between the projection unit frame 22 and the lens barrel holding member 102, so that a frictional resistance is produced against a relative rotation between the prjection unit frame 22 and the lens barrel holding member 102. Due to this friction, the lens barrel 52 can be set at any desired inclination angle. A window or a vent hole 25 is formed in the portion of the wall of the housing 14 near the light source lamp 54.

A stop 55 for locating the illuminating projection unit 11 at a predetermined projecting position is provided on the inner surface of the housing adjacent to the lens barrel 52. A light source power switch 56, which is provided on the same inner surface of the housing 14, is adapted to be turned on upon contact by the projection frame 22 when the projection unit 11 is stopped by the stop 55.

Figure 4:
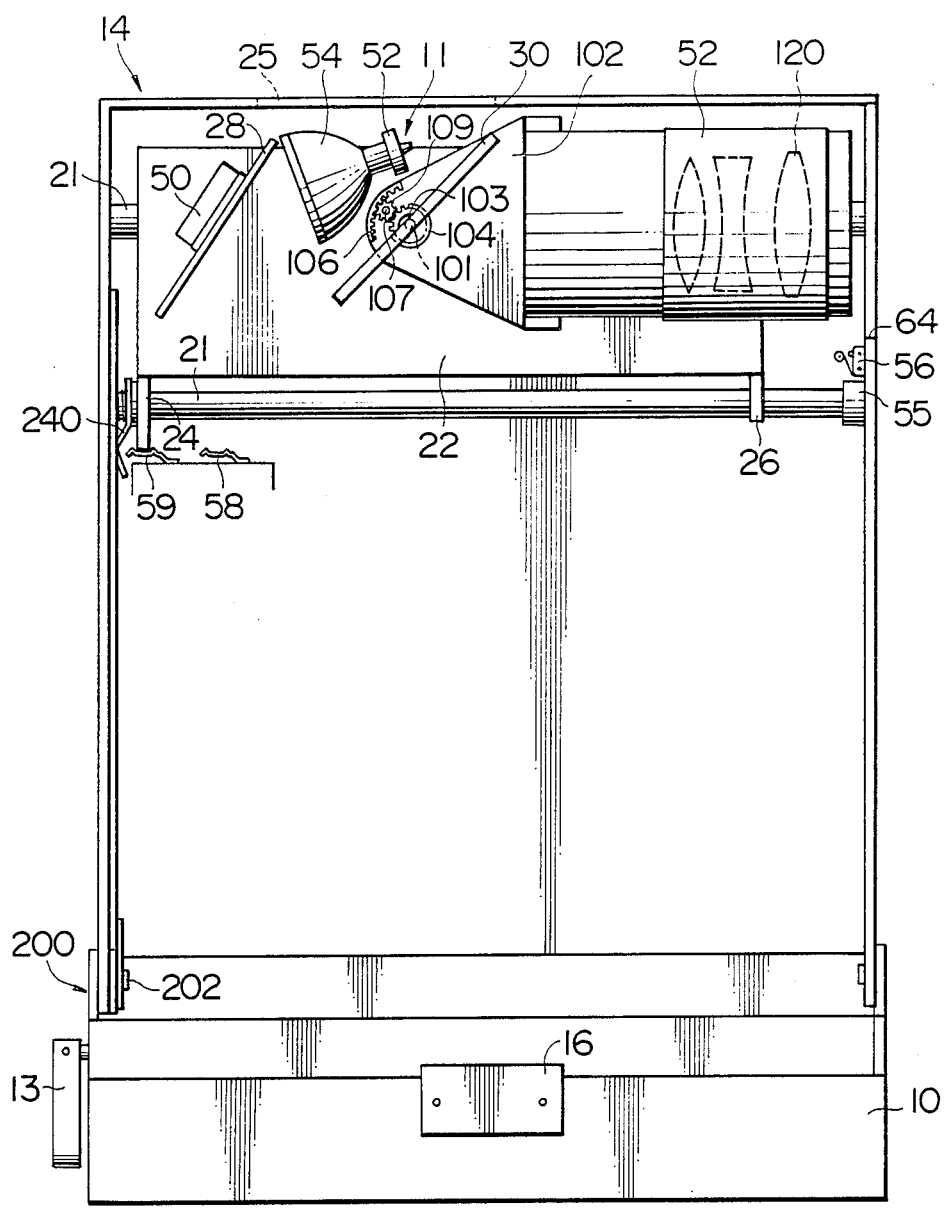
FIG. 4 is a front elevational view of the overhead projector with the projection unit set in the projecting position.

On the other inner surface of the housing 14 are provided a first rping 58 for urging the illuminating projection unit 11 onto the stop 55 with a small force and a second spring 59 for fixing the illuminating projection unit 11 in a storage position shown in FIG. 4 with a small force.

The main body 10 is provided on the top thereof with a mirror Fresnel lens plate 60. The cover member 12 is secured to the main body 10 through a hinge shaft 202. One of the side walls of the main body 10 is provided in its end remote from the hinge shaft 202 with a notch 62 for receiving an end portion of the cover member 12, while the other side wall is devoid of such a notch so that this side wall closes a projection opening 64 in the cover member 12 when the latter is placed in the closing position. A latch member 16 is provided on the end wall of the main body 10 remote from the hinge shaft 202, so as to keep the cover member 12 in the closed position. At the same time, a handle 13 is provided on one side wall of the main body 10 for easier handling and transportation.

Figure 5:
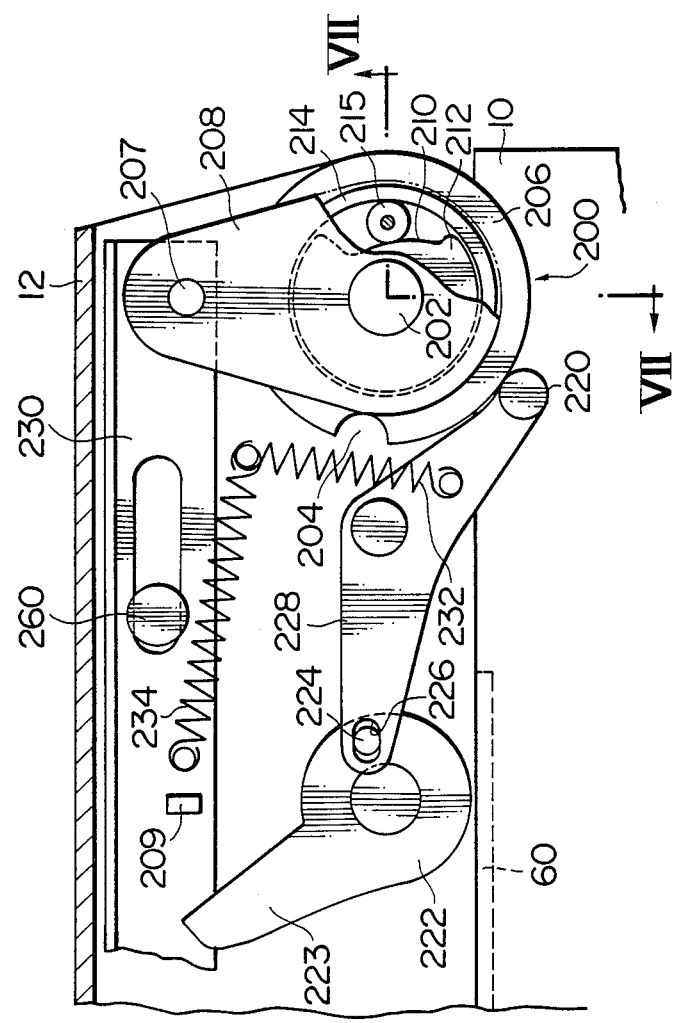
FIG. 5 is a side elevational view of a one-way clutch in the state in which the cover member is in the closed position.

The hinge connection between the cover member 12 and the main body 10 incorporates a releaseable one-way clutch 200 which allows the cover member 12 to swing in the opening direction but prevents the same from swinging in the closing direction. The one-way clutch 200 includes a stationary disk 206 (FIG. 5) provided with a retaining notch 204 and fixed to the main body 10, a cylindrical member 214 integrally and coaxially fixed to the stationary disk 206, a shaft member 202 secured to the stationary disk 206, a cam disk 212 supported by the shaft member 202 and fixed to the cover member 12, and an arm member 208 swingably supported by the shaft member 202 and rotatably carrying a first roller 215 which is disposed between the disk member 214 and the cam surface of the cam disk 212. The cam surface 210 is a continuous surface which is designed such that the distance between the cam surface and the cylindrical member 214 is greater than the diameter of the first roller 215 at an upper portion of the cam surface as shown in FIG. 5 but the distance is smaller than the diameter of the first roller 215 at lower portion of the cam surface.

Figure 6:
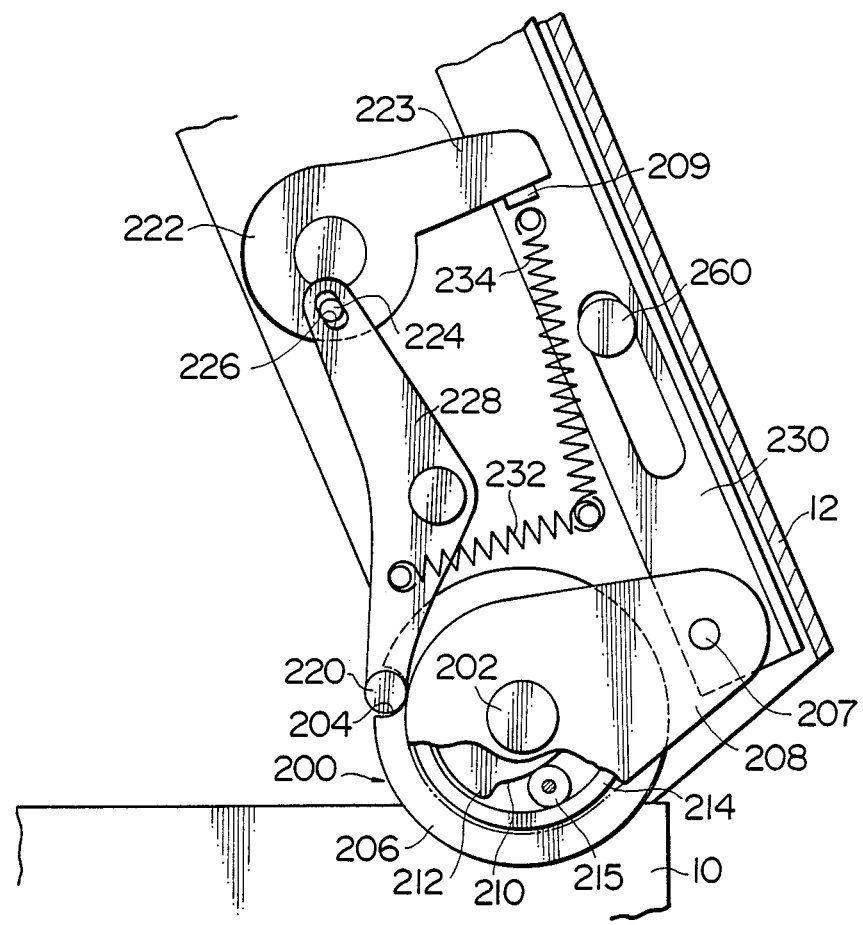
FIG. 6 is a side elevational view of a one-way clutch in the state in which the cover member is in the open position.
Figure 7:
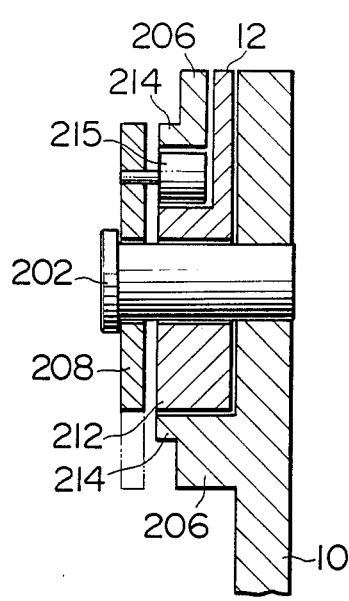
FIG. 7 is a sectional view taken along the line VII—VII of FIG. 5.

The one-way clutch 200 further includes a first release lever 222 having a projection 223 and provided with a third roller 224, a rocker member 228 provided at its one end with a second roller 220 engageable with the recess 204 and at its other end with an engaging hole 226 engageable with the third roller 224, the rocker member 228 being rockably secured to the cover member 12, and a second release lever 230 which is pivotally secured to the arm member 208 through a pin 207 and having a projection 209, the second release lever 230 being slidable on the cover 12. A tension spring 232 for urging the rocker member 228 counter-clockwise and a tension spring 234 for urging the second release lever 230 to the right are provided as shown in FIGS. 5 and 6.

Figure 8:
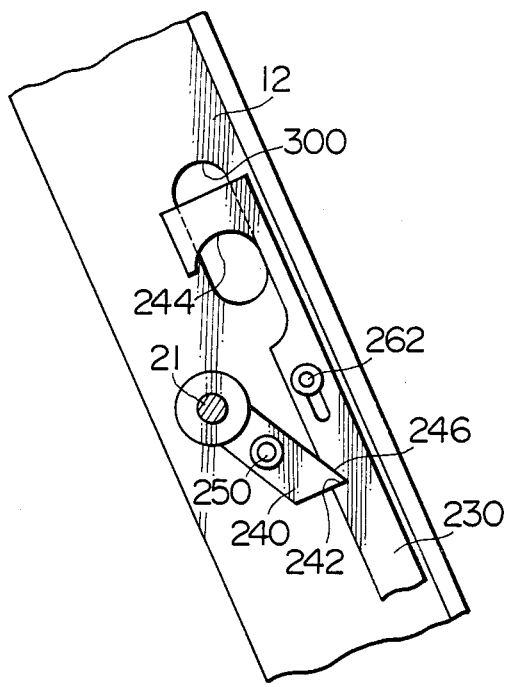
FIG. 8 is a side elevational view of a locking portion of a second release lever.

The second release lever 230 is slidably supported by pins 260, 262 and extends along a side wall of the cover member 12. As will the seen from FIG. 8, the second release lever 230 is provided at its ends remote from the shaft member 202 with a locking notch 242 for engagement with a locking member 240, as well as a finger-retaining notch 244 for retaining a user's finger. An elongated hole 300 is formed in an upper portion of the side wall of the cover member 12 adjacent to the notch 244.

Figure 9:
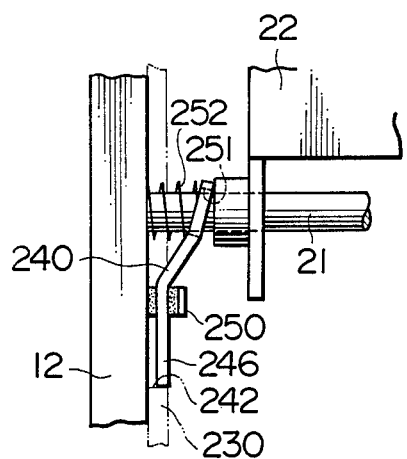
FIG. 9 is an illustration of a locking mechanism with a locking member which locks the second release lever.
Figure 10:
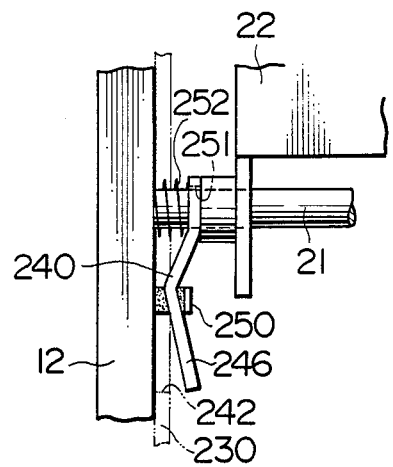
FIG. 10 is an illustration of the locking mechanism in a state in which it does not lock the second release lever.

As will be seen from FIGS. 9 and 10, the locking member 240 is bent at its mid portion and is provided at its one end with a hole 251 through which the rail 21 extends and at its other end with a locking portion 246 for engagement with the locking notch 242. The locking member 240 is rockably supported by the cover member 12 through a pin 250. A compression spring 252 wound on the portion of the rail 21 between the cover member 12 and the locking member 240 is adapted to urge the locking member 240 clockwise as viewed in FIGS. 9 and 10.

The overhead projector of the described embodiment, when not used, is stored with the cover member 12 in the closed position as shown in FIG. 1. In this state, the overhead projector can be handled and transported easily by virtue of the handle 13.

In use, after placing the overhead projector at a desired position, the user unlocks the latch member 16 and opens the cover member 12 to the positions shown in FIGS. 2 and 3. In this state, the one-way clutch 200 becomes operative to prevent the cover member 12 from swinging unintentionally in the closing direction.

When the cover member 12 is in the closed position, the one-way clutch 200 is in the state as shown in FIG. 5. In this state, the second release lever 230 has been slidingly urged to the right by the tension spring 234, while the arm member 208 has been urged clockwise. In consequence, the first roller 215 has been urged clockwise. On the other hand, the rocker member 228, although urged counter-clockwise, is in the position shown in FIG. 5, because the second roller 220 is pressed onto the outer peripheral surface of the stationary disk 206.

As the cover member 12 starts to open, the second release lever 230 and the arm member 208 are rotated clockwise, so that the cam disk 212 and the first roller 215 are rotated clockwise. Although the first roller 215 is urged clockwise, i.e., to move in the direction in which the distance between the cylindrical member and the cam surface 210 is progressively decreased, the first roller 215 does not impede clockwise rotation of the cam disk 212, i.e., the opening movement of the cover member 12, because the cam surface 212 rotates in such a direction as to increase the distance between the cam surface 210 and the cylindrical member 214.

If the user release the cover member 12 after swinging the latter halfway, the cover member 12 tends to swing downward due to the force of gravity. However, the cover member 12 does not actually swing down for the following reason. Namely, in such a case, the cam surface 210 rotates in such a direction as to decrease the distance between itself and the cylindrical member 214, while the first roller 215 urged by the compression spring 234 tends to move in the direction in which the distance between the cam surface 210 and the cylindrical member 214 is progressively decreased. As a result, the movement of the cam surface 210 is prevented by the first roller 215, so that the cover member 12 is prevented from swinging downward.

When the cover member 12 is moved to the fully-open position, the second roller 220 is brought into engagement with the recess 204 as shown in FIG. 6, so that the rocker member 228 is allowed to rock counter-clockwise. The counterclockwise rotation of the rocker member 228 brings the projection 223 of the first release lever 222 into engagement with the projection 209, thereby causing the second release lever 230 to move towards the hinge of the cover member 12. As a result, the second release lever 230 becomes engageable with the locking member 240. However, since the locking portion 246 of the locking member 240 is moved upward by the projection unit frame 22 against the force of the compression spring 252 as shown in FIG. 10, the locking portion 246 does not engage with the locking notch 242. As stated before, the one-way clutch 200 operates also in this state, so that the cover member 12 does not swing in the closing direction unintentionally.

Subsequently, the illuminating projection unit 11 is moved to the right at viewed in FIG. 2 against the restraining force produced by the second spring 59 to a predetermined projecting position where the sliding plate 26 is stopped by a stop 55. In this state, the power switch 56 is pushed by the sliding plate 26 so as to be turned on, and the illuminating projection unit 11 is held in the projecting position by the force of the first spring 58.

Then, as the power switch 56 is turned on, the light source lamp 54 is lit. The light from the light source lamp 54 is reflected by the illuminating mirror 28 and impinges upon the mirror Fresnel plate 60 so as to be reflected by the latter. The light reflected by the mirror Fresnel plate 60 is reflected by the reflection mirror 30 and is projected towards a screen (not shown).

Subsequently, the lens barrel is oscillated up and down so that the projected light beam aims at the screen, whereby the overhead projector becomes ready for use.

Then, an original transparent sheet carrying an image written thereon in opaque or colored transparent ink is placed on the mirror Fresnel plate 60, so that the image is projected and focused on the screen.

As a result of the rightward movement of the illuminating projection unit 11, i.e., the projection unit frame 22, the locking member 240 is rotated clockwise by the force of the compression spring 252. In consequence, the locking member 240 is brought into engagement with the locking notch 242, thereby completely locking the cover member 12 in the fully-open position.

After use of the overhead projector, in order to close the cover member 12, the illuminating projection unit 11 is moved from the projecting position shown in FIG. 2 to the storage position shown in FIG. 4. As a result, the power switch 56 is turned off, so that the light source lamp 54 goes out. Meanwhile, the projection unit frame 22 contacts the locking member 240 so as to disengage the locking member 240 from the locking notch 242, thereby allowing the second release lever 230 to slide against the tension of the tension spring 234.

The user then pulls, with his finger retained by the finger-retaining notch 244 through the elongated hole 300, the second sliding lever 230 away from the hinge between the main part 10 and the cover member 12. As a result, the projection 209 causes the first lever 222 to rotate counte-clockwise as viewed in FIG. 6, so that the second roller 220 comes out of the notch 204. At the same time, the arm member 208 is rotated counterclockwise so that the first roller 215 is moved counterclockwise, i.e., in the direction in which the distance between the cylindrical member 214 and the cam surface is progressively increased, so that the cam disk 212 and, hence, the cover member 12 integral therewith can be moved to the closing position without being impeded by the first roller 215.

It is possible to use a ratchet mechanism known per se as the one-way clutch means in place of the one-way clutch having the described construction. It is also possible to use a simple pillar as the swingable member for supporting the projection unit.

The invention has thus been shown and described with reference to specific embodiments. However, it should be noted that the invention is in no way limited to the details of the illustrated arrangements, and changes and modifications may be made without departing from the scope of the appended claims.

What is claimed is:

1. An overhead projector comprising a base including a Fresnel plate, a projection unit, a swingable member for supporting the projection unit and swingably secured to the base, one-way clutch means through which the swingable member is secured to the base, the one-way clutch means preventing swinging motion of the swingable member towards the base in all pos of the swingable member, and manually operable means connected to the one-way clutch means for releasing the same, to thereby permit the swingable member to move toward the base.

2. An overhead projector having a base including a Fresnel plate, a projection unit, and a swingable member for supporting the projection unit and swingably secured to the base, comprising one-way clutch means through which the swingable member is secured to the base, the one-way clutch means including a ratchet and being adapted to prevent swinging motion of the swingable member towards the base; and manually operable means connected to the one-way clutch means for releasing the same, to thereby permit the swingable member to move toward the base.

3. An overhead projector according to claim 1, wherein the swingable member constitutes a rigid one-piece cover member for covering the base.

4. An overhead projector according to claim 1, wherein the swingable member constitutes a supporting post.

5. An overhead projector comprising a base including a Fresnel plate, a projection unit, a swingable member for supporting the projection unit and swingably secured to the base, the projection unit being adapted to be selectively set either in a projecting position or in a storage position, one-way clutch means through which the swingable member is secured to the base, the one-way clutch means locking the projection unit in its projecting position and preventing swinging motion of the swingable member towards the base in all positions of the swingable member, and means for releasing the locking function of the one-way clutch means to permit movement of said projection unit towards said storage position.

6. An overhead projector having a reflecting Fresnel plate, an illumination unit including a light source and located over the Fresnel plate, and a projection lens and located over the Fresnel plate, the projector comprising, in combination, a base for supporting the Fresnel plate, and a cover member for supporting the illumination unit and having opposed end portions, the cover member carrying the projection unit at one end portion thereof and being pivoted on the base at the other end portion for movement about a pivot axis, the projection unit being mounted so as to slide on the cover member parallel to the pivot axis, and the projection lens protruding from the cover member in response to the sliding movement of the projection unit with respect thereto.

7. An overhead projector comprising, in combination: a base member including a Fresnel plate; a swingable member connected to the base member for swinging movement with respect thereto between an open and a closed position; a projection unit carried by the swingable member; means for pivotally securing the swingable member to the base; one-way clutch means including cam means carried by one of said members and a follower carried by the other member for limiting swinging motion of the swingable member toward said closed position; and a lever mechanism movably supported by the swingable member for moving said follower relative to said other member to thereby release the cam means, to permit the swingable member to move toward said closed position.

8. An overhead projector comprising, in combination: a base including a Fresnel plate; a swingable member connected to the base for swinging movement with respect thereto between an open and a closed position; a projection unit carried by the swingable member; and one-way clutch means for securing the swingable member to the base, the one-way clutch means including cam means carried by the base for limiting swinging motion of the swingable member toward said closed position in all positions of the swingable member, a lever mechanism movably supported by the swingable member for releasing the cam means, to permit the swingable member to move toward said closed position, and means operable when the swingable member is in its fully open position for locking the lever mechanism.

* * * * *